Oct. 23, 1951  A. G. PLIMMER ET AL  2,572,756
COMBINED MACHINE TOOL
Filed Oct. 7, 1947  4 Sheets-Sheet 1

INVENTORS
ALFRED G. PLIMMER
FREDERICK J. KISTNER
BY
H. K. Parsons & E. W. Wright,
ATTORNEYS

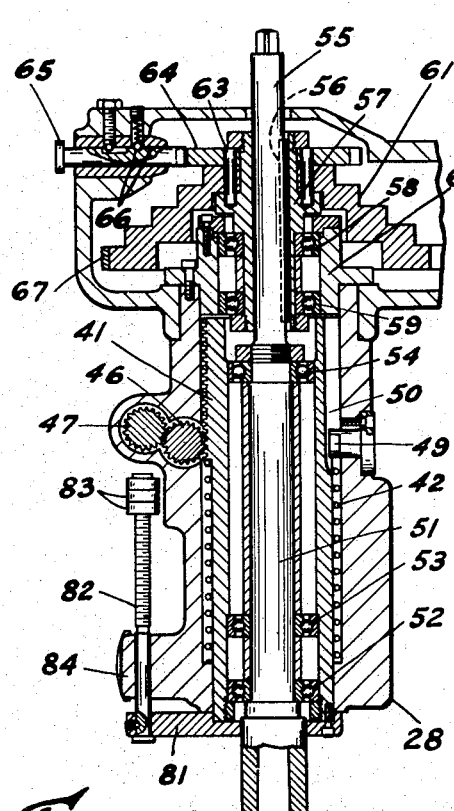
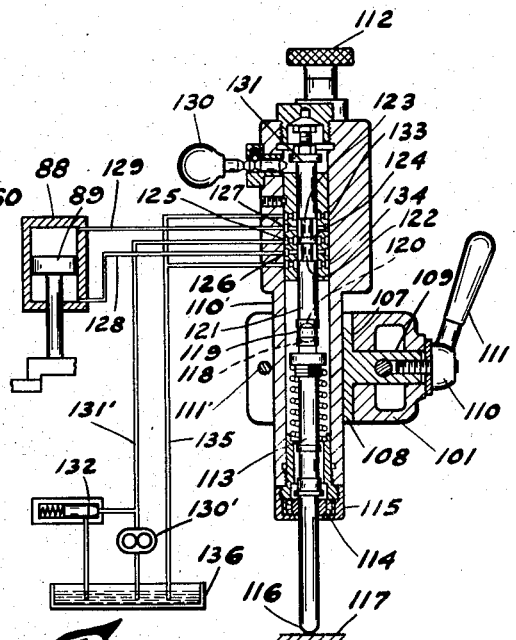
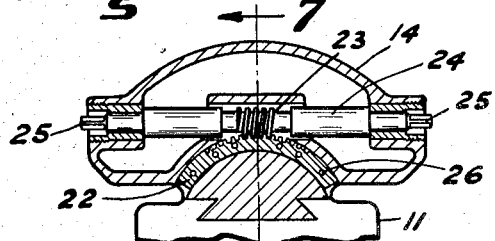
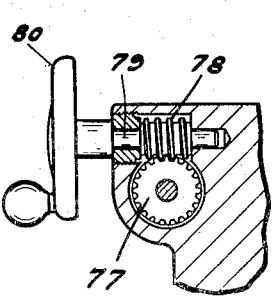

INVENTORS
ALFRED G. PLIMMER
FREDERICK J. KISTNER
BY
H. K. Parsons + L. W. Wright.
ATTORNEYS Patented Oct. 23, 1951

2,572,756

UNITED STATES PATENT OFFICE 2,572,756

COMBINED MACHINE TOOL

Alfred G. Plimmer and Frederick J. Kistner, Cincinnati, Ohio, assignors to The Cincinnati Milling Machine Co., Cincinnati, Ohio, a corporaton of Ohio Application October 7, 1947, Serial No. 778,308

3 Claims. (Cl. 29—26)

This invention relates to machine tools and more particularly to a combined machine tool.

One of the objects of this invention is to provide an improved combined machine to facilitate the removal of material to form die cavities and the like and to impart irregular shapes to the surfaces of the cavity so formed.

Another object of this invention is to provide a combined machine having a plurality of tools with improved means to facilitate the selective positioning of the tools in operative relation to a work support.

A further object of this invention is to provide a combined machine tool in which certain tools may be selectively utilized for directly forming surfaces, and other tools may be tracer controlled to form irregular surfaces in accordance with a pattern.

A still further object of this invention is to provide a machine in which is combined the necessary tools for completely machining a die cavity in one setting of the work piece.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a sectional view through one of the tool spindles of the machine as viewed on the line 3—3 of Figure 1.

Figure 4 is a section through the tracer mechanism including diagrammatic hydraulic connections thereto as viewed on the line 4—4 of Figure 1.

Figure 5 is a detail section on the line 5—5 of Figure 1.

Figure 6 is a detail section on the line 6—6 of Figure 2.

Figure 7 is a detail section on the line 7—7 of Figure 6.

Figure 1:
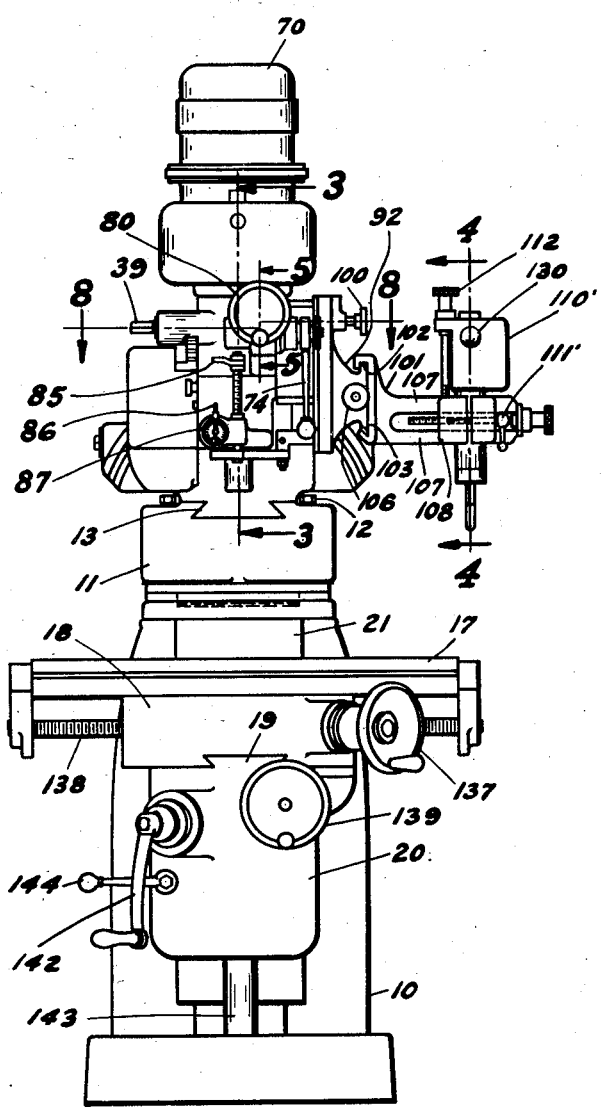
Figure 1 is a front view of a machine embodying the principles of this invention.
Figure 2:
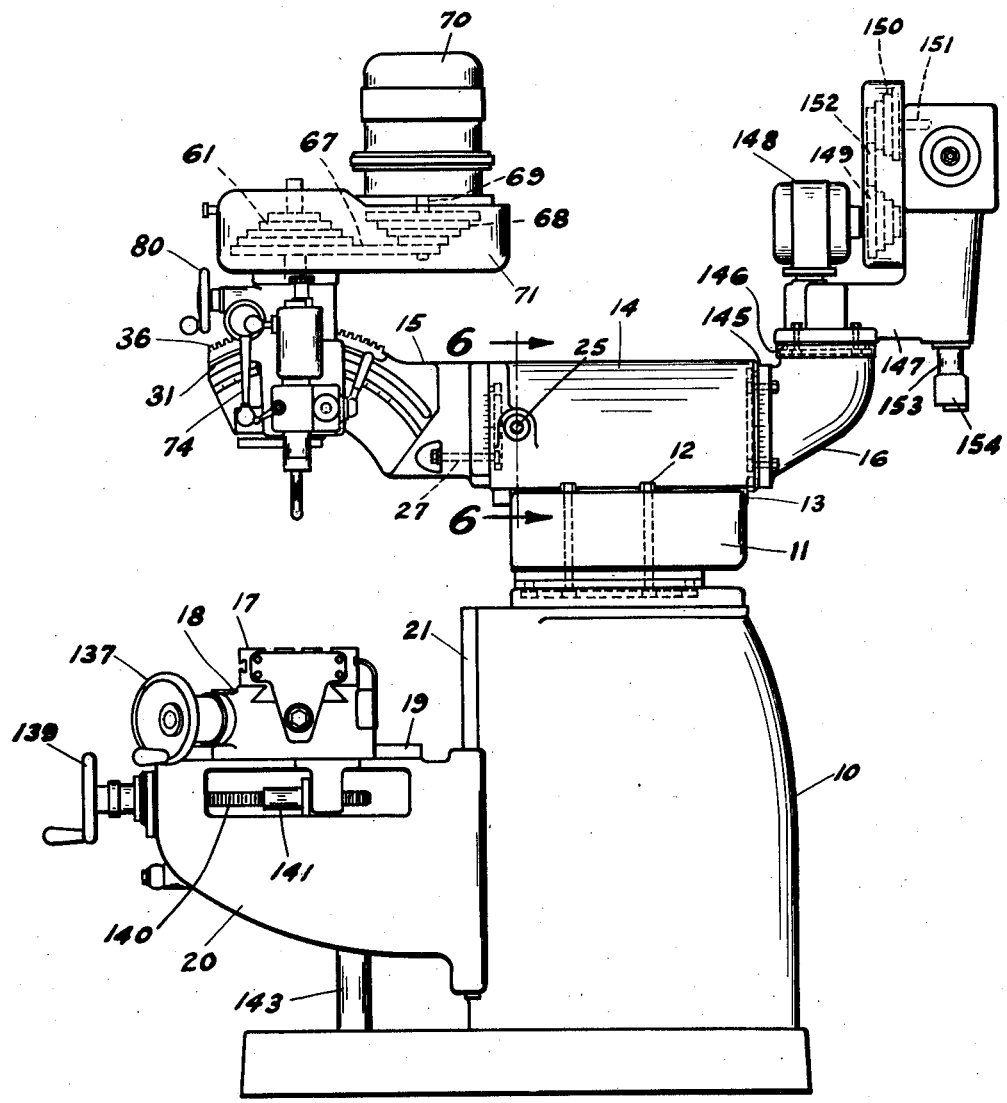
Figure 2 is a side view of the machine shown in Figure 1 as viewed from the right hand side of that figure.

Referring to the drawings in which like reference numerals indicate like or similar parts, reference numeral 10 in Figure 2 indicates the column of the machine having a turret 11 mounted on the top thereof for rotatable adjustment. The turret is adapted to be clamped to the top of the column by suitable T-bolts 12. The turret 11 has a dovetailed guideway 13 formed therein, as shown in Figure 1, in which a cross slide 14 is slidably mounted. The slide 14 has oppositely extending arms 15 and 16 rotatably attached to each end thereof. These arms 15 and 16 support different tool instrumentalities which may be selectively brought into operative relation with respect to a work table 17 by rotation of the turret 11.

The table 17 is guided on a saddle 18, which, in turn, is guided for movement toward and from the column 10 on guideways 19 formed on the top of a knee 20. The knee is guided for vertical movement on guideways 21 formed on a vertical face of the column 10. The arm 15 has a rack segment 22 secured to the end thereof as shown in Figure 6 which is engaged by an adjusting worm 23 which is rotatably mounted in the slide 14 on a shaft member 24 which has squared ends 25 to which a suitably formed operating wrench may be applied for causing rotation of the worm. The rack member 22 is secured to the end of the arm 15 as more particularly shown in Figure 7 by means of bolts 26; and T-headed bolts 27 as shown in Figures 2 and 7 are utilized for clamping the parts together after adjustment. By means of this mechanism, a tool spindle carried by the arm 15 may be angularly adjusted in a first plane with respect to the table 17.

Figure 8:
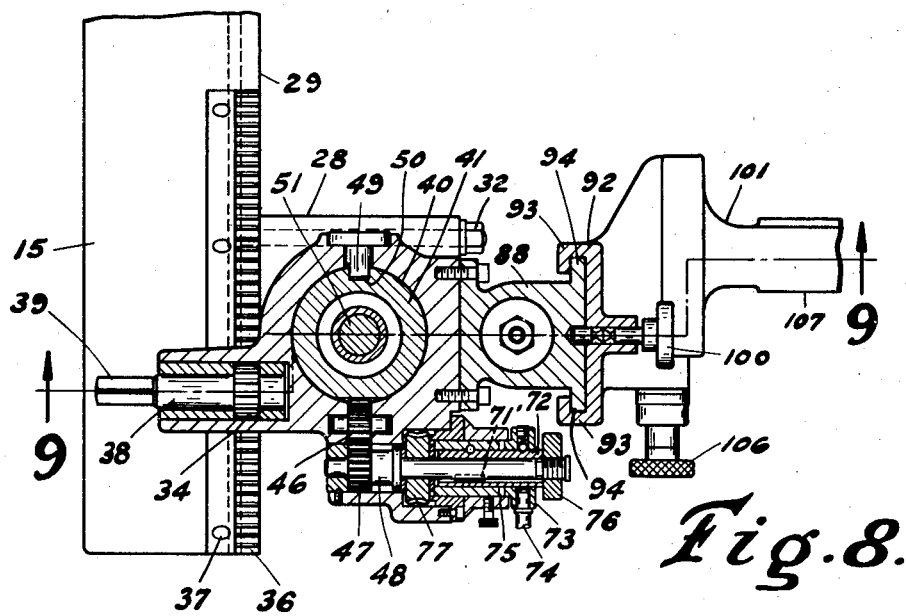
Figure 8 is a sectional plan view on the line 8—8 of Figure 1.
Figure 9:
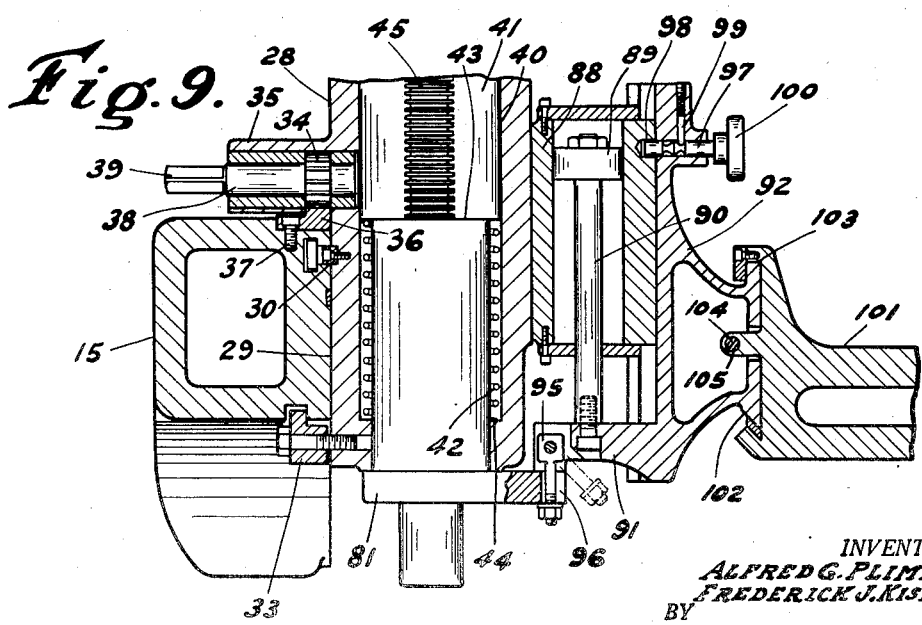
Figure 9 is a sectional view in elevation as viewed on the line 9—9 of Figure 8.

Referring to Figures 8 and 9, the gooseneck arm 15 supports a spindle carrier 28 which is guided on the face 29 of the arm 15 by an arcuate key member 30. This key member rides in an arcuate slot 31 as shown in Figure 2, which means that the tool spindle carried by the spindle carrier may be angularly adjusted in a second vertical plane with respect to the work support 17. The spindle carrier is clamped to the face of the arm 15 by T-headed clamping bolts 32 as shown in Figure 8, and by the clamping member 33 shown in Figure 9.

The angular adjustment in the second plane is effected by a pinion 34 which is rotatably mounted in an integral bracket 35 of the spindle carrier for engagement with an arcuate rack 36 which is secured to the arm 15 by suitable bolts 37. The pinion 34 is mounted on a shaft 38 which has a suitably formed end 39 for receiving an operating wrench to effect rotation of the pinion.

The spindle carrier 28 has a bore 40 formed therein in which is slidably mounted a quill member 41, there being a spring 42, as shown in Figure 9, which is interposed between a shoulder 43 formed on the quill and the end wall 44 of the bore 40 to continuously urge the quill in an upward direction and serve as a counterbalance. The quill has rack teeth 45 formed on one face for engagement by a pinion 46 as shown in Figure 9, the pinion being rotated by a second pinion 47 mounted on a shaft 48. The quill is held against turning by a key member 49 which, as shown in Figure 8, engages a keyway 50 formed in the periphery of the quill and extending longitudinally thereof as shown in Figure 3.

Referring to Figure 3, the quill 41 has a bore formed therein in which is rotatably mounted a tool spindle 51. The tool spindle is journaled on a series of anti-friction bearings 52, 53, and 54 which are movable with the quill. The spindle 51 has a reduced section 55 in which is formed a spline 56 whereby the spindle may be adjusted axially relative to a driving sleeve 57 which is held against axial movement in the following manner.

The sleeve 57 is journaled on anti-friction thrust bearings 58 and 59 which are mounted in the fixed support 60 and the upper end of the sleeve is provided with a multiple step pulley 61 secured thereto by locking pins 63. A notched plate 64 is also secured to the sleeve by the pins 63, and this plate is adapted to be engaged by a locking pin 65 which is mounted for radial movement with respect to the plate 64. Suitable detents 66 are provided in the pin for holding it in either a locking position or an unlocked position. This serves to hold the spindle against rotation when tools are being applied to the spindle. As shown in Figure 2, the stepped pulley 61 is connected by a suitable driving belt 67 to a multiple step pulley 68 secured to the end of an armature shaft 69 of a motor 70. The motor is supported on the overhanging bracket 71 which is secured to the spindle carrier 28. By adjusting the belt 67 relative to the different steps, different speeds of rotation may be obtained for driving the spindle.

The quill is adapted to be moved up and down by the mechanism shown in Figure 8, and, as shown, the previously described shaft 48 is provided with a key 71' which serves as a connection to a sleeve 72 upon which is mounted the hub 73 of a manual control lever 74. By shifting the hub 73 to the left to engage clutch teeth 75 the control lever 74 may be utilized to effect fast rotation of the gear 47 and thereby fast movement of the quill up or down. By shifting the lever 74 to the right, the clutch teeth may be disengaged, and then by tightening the lock nut 76 a worm wheel 77 may be frictionally connected to the shaft 48 to effect slow rotation thereof by means of the worm 78 which, as shown in Figure 5, is operatively connected to the worm wheel 77.

The worm wheel 78 is supported by a shaft 79 to which is connected manually rotatable hand wheel 80. It will now be obvious that the quill may be moved up or down at a fast rate by the lever 74 or slowly fed by means of the rotatable hand wheel 80.

The lower end of the quill, as shown in Figure 3, is provided with a laterally extending arm 81 to which is attached a threaded rod 82 that is provided with lock nuts 83. The shaft passes through a laterally extending boss 84 of the quill housing and by adjusting the members 83 a positive stop may be provided for limiting downward movement of the quill. As shown in Figure 1, one of the members 83 may be provided with a laterally extending arm 85 which is adapted to engage the operating plunger 86 of an indicator gage 87 whereby precision movements may be made with the quill.

The spindle carrier 28 has secured thereto a cylinder 88, as shown in Figure 9, and a piston 89 is slidably mounted in the cylinder and connected by a piston rod 90 to a laterally extending bracket 91 of a vertically movable slide 92. The slide 92, as shown in Figure 8, is provided with square guideways 93 which engage guide surfaces 94 formed on the cylinder housing 88. The laterally extending member 91, as shown in Figure 9, is adapted to be connected by laterally swinging a bolt 95 through a slot 96 formed in the periphery of the member 81 which is secured to the end of the quill as previously explained. When the bolt 95 is in the solid line position, as shown in Figure 9, the piston 89 is operatively connected to the quill and when it is swung to the dotted line position it is disconnected from the quill.

The piston and cylinder are provided for cases in which it is desired to utilize tracer control operation of the spindle. Normally, the slide 92 is held in its extreme upper position by means of a pin 97 which is adapted to engage a hole 98 formed in the cylinder housing 88. The pin is held in this position by a detent 99, but upon withdrawing the pin by means of the knob 100, the slide 92 is free to move vertically.

Referring to Figure 1, the tracer control mechanism is supported on a bracket 101 by guideways 102 and 103 formed horizontally on the vertically sliding member 92. The bracket 101 may be adjusted along these guideways by an adjusting screw 104 which is threaded at 105, Figure 9, to the member 101 and, as shown in Figure 8, is provided with an operating knob 106 whereby the screw may be rotated to effect horizontal adjustment of the member 101. The member 101 is provided with a flat guiding surface 107 which is divided as shown in Figure 1 and against this surface is fitted a holder 108 which, as shown in Figure 4, is provided with a laterally extending lug 109 which passes through the opening between the faces 107 and through the bracket 101 and provided with a clamping nut 110 which is provided with an operating handle 111 whereby the holder 108 may be clamped to the bracket 101 by pressure.

The holder 108 is provided with a bore in which is slidably mounted a tracer housing 110'. The holder 108 is bifurcated and a clamping screw 111' passes through the bifurcated portions for clamping the tracer housing 110' in position. To assist in effecting such adjustment the tracer housing 110' is provided with an adjusting screw 112, the end of which engages the top of the holder 108 so that by slightly loosening the clamping screw 111' the tracer housing 110' may be vertically adjusted.

The tracer housing 110' is provided with a tracer arm 113 which is supported for universal lateral movement by a spherical anti-friction bearing 114 mounted in a cup member 115 which is threaded to the lower end of the tracer housing. The tracer arm is provided with a tracer finger 116 which is adapted to engage a suitable pattern 117. The upper end of the tracer arm 113 is provided with a socket 118 in which is mounted a ball 119 that fits in a socket 120 formed in the lower end of a valve stem 121. By means of the ball 119 any lateral movement of the tracer finger 116 pivoting about its spherical bearing 114 will cause the ball to rise and thereby effect axial movement of the valve stem 121. The valve stem is provided with a pair of annular grooves 122 and 123 separated by an annular land 124 which thereby forms a reversing valve for alternately connecting a pressure port 125 with motor ports 126 and 127 which are connected by pipes 128 and 129 to opposite ends of the cylinder 88. When the tracer mechanism is not in use a latch 130 is inserted to engage a shoulder 131 on the valve stem to raise the valve to a position in which the pressure port 129 is connected to the channel 128, and thereby hold the piston 89 in its extreme upward position. The port 125 is supplied with pressure from a suitable pump 130' mounted on the machine and connected by line 131' to the pressure port. The line 131' has a suitable relief valve 132 connected thereto. The tracer valve is also provided with suitable exhaust ports 133 and 134 which are connected to a return line 135 which returns the fluid to a suitably located reservoir 136 for return by the pump 130' to the system.

In the operation of this machine for die sinking purposes the table and saddle are manually controlled, and to facilitate their movement the hand wheel 137 is rotatably mounted on the saddle and operatively connected through a rotatable nut not shown to the table feed screw 138 shown in Figure 1 for effecting translation of the table 17; and a second hand wheel 139 is mounted on the knee and secured to the end of the saddle feed screw 140, shown in Figure 2, which is threaded through an anti-friction nut 141 which is carried by the saddle 18.

By means of these two hand wheels, which, it will be noted, are closely arranged for the convenience of the operator, the saddle and table may be simultaneously controlled whereby the operator may cause the tracer to scan the irregular outline of a pattern and conveniently watch the operation of the tracer and the tool.

Since die cavities have substantial depth, at least to the extent that the full depth of material cannot be removed by a cutting tool in one pass over the work, material is usually removed in layers and to facilitate this the knee of the machine is provided with vertical adjusting means comprising the control lever 142 shown in Figure 1 which is operatively connected to a knee elevating screw contained within the housing 143. The knee is adapted to be clamped by conventional clamping means operable by the control lever 144 shown in Figure 1.

It may be possible to remove some of the material by straight drilling or boring operations, and in this case the tracing mechanism is disconnected and then the tool spindle provided with a suitable tool may be operated by either the manual control lever 74 or the hand wheel 80. By use of the indicator 87 precision depth drilling operations may be performed as well as duplicate drilling operations.

In some die work it is desirable to have square corners in the die cavity and for this purpose the turret 11 is rotated through 180 degrees which brings into position a slotting device which is mounted on the end of the arm 16. The arm 16 is attached at 145 to the end of the slide 14 in a similar manner to the arm 15 for angular adjustment about a horizontal axis. The arm 16 also has a horizontal face 146 upon which is mounted a slotting attachment housing 147 which is also angularly adjustable about the center of the face 146. The housing 147 has a motor 148 mounted thereon, the armature shaft of which is connected by multiple cone pulleys 149 and 150 to a drive shaft 151. A belt 152 travels over these pulleys and is laterally shiftable to effect different rate changes between the motor and the driven shaft 151. The shaft 151 drives an eccentric, not shown, to the ram 153, the end of which is provided with a chuck 154 for receiving suitable slotting or shaping tools.

By means of this combined arrangement, it is not necessary to remove the work to another machine with its attendant time losses to perform slotting or shaping operations. In some cases the die cavity runs completely through the die block and after the walls have been suitably formed they may be finished to a straight line by means of the slotting attachment.

There has thus been provided an improved combined machine for die sinking purposes which is capable of drilling, shaping, as well as performing pattern controlled milling operations.

What is claimed is:

1. In a machine tool having a work support and means for supporting a tool spindle in operative relation to the work support including a spindle carrier adjustably mounted on the machine and a quill slidably mounted in the carrier and journaling the spindle for movement therewith, the combination of means for controlling the movement of the quill including a cylinder integrally attached to said carrier, a piston rod and a piston slidably mounted in the cylinder for movement parallel to the axis of the quill, hydraulic means for actuating the piston, a slide supported and guided by said carrier for movement parallel to the quill, means connecting the piston rod to said slide, means for connecting and disconnecting the slide to said carrier, and other means for connecting and disconnecting the slide to said quill whereby when the slide is disconnected from the carrier and connected to the quill they may be jointly actuated by said piston, and when the slide is connected to the carrier and disconnected from the quill, the quill is movable independently of the slide.

2. In a machine tool having a work support and a spindle carrier mounted on the machine, and a quill slidably mounted in the carrier and journaling a spindle for movement therewith, the combination of means for controlling the movement of the quill including a cylinder integrally attached to said carrier, a piston rod and a piston slidably mounted in the cylinder for movement parallel to the axis of the quill, hydraulic means for actuating the piston, a slide supported and guided by said carrier for movement parallel to the quill, means connecting the piston rod to said slide, means for connecting and disconnecting the slide to said carrier, other means for connecting and disconnecting the slide to said quill whereby when the slide is disconnected from the carrier it may be connected to the quill for joint power movement by the piston, and when the slide is connected to the carrier and disconnected from the quill, the latter may be independently moved with respect to said slide, and separate control means for moving the quill and contained spindle at fast and slow rates respectively.

3. In a machine tool having a work support and means for supporting a tool spindle in operative relation to the work support including a spindle carrier adjustably mounted on the machine and a quill slidably mounted in the carrier and journaling said spindle for movement therewith, the combination of means for controlling the movement of the quill including a cylinder integrally attached to said carrier, a piston rod and a piston slidably mounted in the cylinder for movement parallel to the axis of the quill, a slide supported and guided by said carrier for movement parallel to the quill, means connecting the piston rod to said slide, means for connecting and disconnecting the slide to said carrier, and other means for connecting and disconnecting the slide to said quill whereby when the slide is disconnected from the carrier it may be connected to the quill for joint movement therewith under control of said piston, and when the slide is connected to the carrier the quill is disconnected from the slide for independent movement with respect to said slide, separate control means for moving the quill and contained spindle at fast and slow rates respectively, and means to effect angular adjustment of the carrier with respect to said work support in two planes respectively intersecting in a normal to the plane work of the support.

ALFRED G. PLIMMER.
FREDERICK J. KISTNER.

REFERENCES CITED

The following references are of record in the file of this patent:

UNITED STATES PATENTS

| Number | Name | Date |
|---|---|---|
| 571,402 | Schneider | Nov. 17, 1896 |
| 895,788 | Potter | Aug. 11, 1908 |
| 1,242,775 | Curtis | Oct. 9, 1917 |
| 1,382,339 | Bullard | June 21, 1921 |
| 1,488,071 | Shaw | Mar. 25, 1924 |
| 1,945,632 | Flanders | Feb. 6, 1934 |
| 2,011,488 | Swahnberg | Aug. 13, 1935 |
| 2,039,294 | Campbell | May 5, 1936 |
| 2,068,890 | Sassen | Jan. 26, 1937 |
| 2,108,781 | Schauer | Feb. 15, 1938 |
| 2,120,196 | Wright | June 7, 1938 |
| 2,125,641 | McKee | Aug. 2, 1938 |
| 2,164,396 | Foster | July 4, 1939 |